United States Patent
Dhurjaty et al.

(10) Patent No.: US 6,219,083 B1
(45) Date of Patent: *Apr. 17, 2001

(54) LASER MODE HOP FIX

(75) Inventors: Sreeram Dhurjaty, Rochester; Douglas Seim, Spencerport; Brian K. Rhoda, Rochester, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,132

(22) Filed: Dec. 21, 1998

Related U.S. Application Data

(60) Provisional application No. 60/109,816, filed on Nov. 25, 1998.

(51) Int. Cl.[7] ..................................................... B41J 2/435
(52) U.S. Cl. ..................... 347/246; 347/247; 347/236; 347/237
(58) Field of Search ...................... 347/236, 237, 347/246, 247; 372/33, 38; 250/582, 586, 587, 370.14; 359/490, 495, 496, 629, 634, 636, 639

(56) References Cited

U.S. PATENT DOCUMENTS

| 5,107,275 | * | 4/1992 | Tsuruoka et al. | 347/247 |
| 5,309,461 | * | 5/1994 | Call et al. | 372/38 |
| 5,557,469 | * | 9/1996 | Markle et al. | 359/683 |

\* cited by examiner

*Primary Examiner*—N. Le
*Assistant Examiner*—Hai C. Pham
(74) *Attorney, Agent, or Firm*—William F. Noval

(57) ABSTRACT

A laser imaging system having a diode laser for producing a laser beam; a beamsplitter for splitting the laser beam into a laser writing portion and a feedback portion; a photodetector for detecting the feedback portion; a photodetector amplifier for amplifying the output of the photodetector; a sample and hold coupled to the photodetector amplifier; an integrator adder; an integrator for integrating the outputs of the photodetector amplifier and the sample and hold processed by the integrator adder; and a laser input circuit including a laser amplifier, a linear power signal provider, a threshold power signal provider, and a laser input adder for adding the laser power signal, the linear power signal, and the output of the integrator.

1 Claim, 1 Drawing Sheet

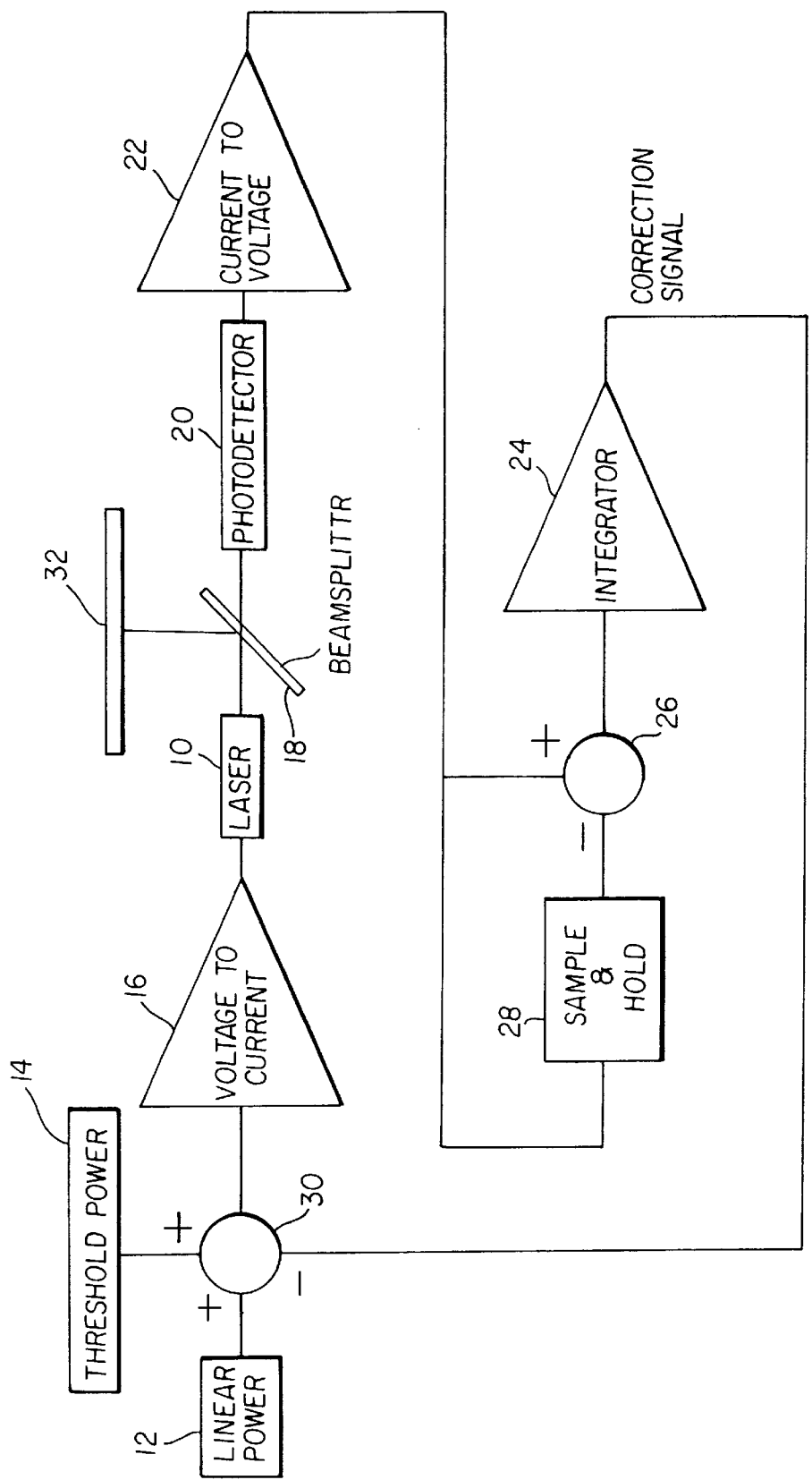

LASER MODE HOP FIX

CROSS REFERENCE TO RELATED APPLICATION

Reference is made to and priority claimed from U.S. Provisional Application Ser. No. 60/109,816, filed Nov. 25, 1998, entitled LASER MODE HOP FIX.

FIELD OF THE INVENTION

This invention relates in general to laser imaging systems and relates more particularly to a circuit for correcting mode hop in the laser used in a laser printer.

BACKGROUND OF THE INVENTION

The Mode Hop Fix circuit corrects for the exposure errors that occur due to laser mode hops. Mode hopping is a characteristic of semiconductor lasers where the output emission wavelength can jump suddenly as the operating condition of the laser changes. Mode hops can be caused by changes in the laser's temperature and optical feedback. Mode hops cause exposure changes in two ways. First, the emission efficiency of the laser generally changes when the mode hops resulting in an obvious change in exposure. Second, the emission wavelength changes when a mode hop occurs. If the media's response curve isn't sufficiently flat it is possible that noticeable exposure changes will occur.

SUMMARY OF THE INVENTION

According to the present invention, there is provided a solution to the problems of the prior art.

According to a feature of the present invention, there is provided a laser imaging system comprising: a diode laser for producing a laser beam; a beamsplitter for splitting the laser beam into a laser writing portion and a feedback portion; a photodetector for detecting the feedback portion; a photodetector amplifier for amplifying the output of the photodetector; a sample and hold coupled to the photodetector amplifier; an integrator adder; an integrator for integrating the outputs of the photodetector amplifier and the sample and hold processed by the integrator adder; and a laser input circuit including a laser amplifier, a linear power signal provider, a threshold power signal provider, and a laser input adder for adding the laser power signal, the linear power signal, and the output of the integrator.

ADVANTAGEOUS EFFECT OF THE INVENTION

The Mode Hop Fix circuit corrects for the exposure errors that occur due to laser mode hops.

BRIEF DESCRIPTION OF THE DRAWINGS

The Figure a schematic diagram of the present invention.

DETAILED DESCRIPTION OF THE INVENTION

As shown in The Figure, the power level of the laser 10 is set primarily by the sum of a Linear Power Signal 12 and a Threshold Power Signal 14. An amplifier 16 is used to convert this voltage signal into a proportional current signal which is used to power the diode laser 10. The optical path of the laser emission includes a beamsplitter 18 which passes a minor portion of the emission to a photodetector 20. The photodetector 20 produces a current in proportion to the laser beam strength which is converted by an amplifier 22 to a proportional voltage. Just before the printer begins printing a page 32, it turns the laser 10 on at the specific laser power required for that page. Once the laser drive circuit has become stable the sample and hold 28 is commanded to sample the photodetector amplifier 22 output. At this time, the integrator 24 is made active. During the remainder of the page, the integrator 24 compares (26) the output of the sample and hold 28 with the output of the photodetector amplifier 22. If they are not the same, the output of the integrator 24 moves to compensate. If the photodetector amp 22 output is higher than the sample and hold 28, then the laser mode hop has resulted in increased laser efficiency. The integrator output correction signal will move up relatively slowly. The correction signal is subtracted 30 from the summation of the Linear Power and Threshold Power signals and results in reduced laser power. The integrator 24 output will continue to rise until the photodetector amplifier 22 output equals the sample and hold. Similar dynamics occur if the photodetector amplifier's 22 signal falls below the sample and hold 28 output.

As described, the system will handle efficiency changes as long as the response of the photodetector is flat across the variety of wavelengths the laser may reach in mode hops. If the media's response curve isn't flat the system can be altered to keep the apparent exposure flat. The beamsplitter optics can be coated in such a way as to have a response curve that is the same as the media. That is to say it will pass a bit more light at the end of the spectrum where the film is more sensitive and less light where the film is less sensitive. In this way if the film is more sensitive to a wavelength we are passing more of it to the photodetector. The correction system interprets that as a higher emission efficiency and turns the laser output down a bit. A system of laser, photodetector and film can be tuned by the beamsplitter coatings to result in flat effective exposure curve.

The invention has been described in detail with particular reference to certain preferred embodiments thereof, but it will be understood that variations and modifications can be effected within the spirit and scope of the invention.

PARTS LIST

10 laser
12 linear power signal
14 threshold power signal
16 amplifier
18 beamsplitter
20 photodetector
22 amplifier
24 integrator
26 compare
28 sample and hold
30 subtract
32 page

What is claimed is:

1. A laser imaging system comprising:
   a diode laser for producing a laser beam for exposing media;
   a beamsplitter for splitting said laser beam into a laser writing portion and a feedback portion;
   a coating on the beamsplitter to alter an efficiency of the beamsplitter over variations in the wavelength of the laser beam wherein said coating has a response curve that is the same as said media so that more of said laser beam is passed where the media is more sensitive and less of said laser beam is passed where the media is less sensitive;

a photodetector for detecting said feedback portion of said laser beam and for creating a proportionate photodetector signal;

a photodetector amplifier for amplifying said photodetector signal a sample and hold coupled to said photodetector amplifier for producing a sample and hold signal;

an integrator adder for processing said sample and hold signal; an integrator for integrating said amplified photodetector signal and said sample and hold signal processed by said integrator adder; and a laser input circuit including a laser amplifier, a linear power signal provider, a threshold power signal provider, and a laser input adder for adding said threshold power signal, said linear power signal, and said output of said integrator.

* * * * *